June 11, 1946. W. F. MITCHELL 2,401,838
BORING MACHINE
Filed March 18, 1943 4 Sheets-Sheet 2
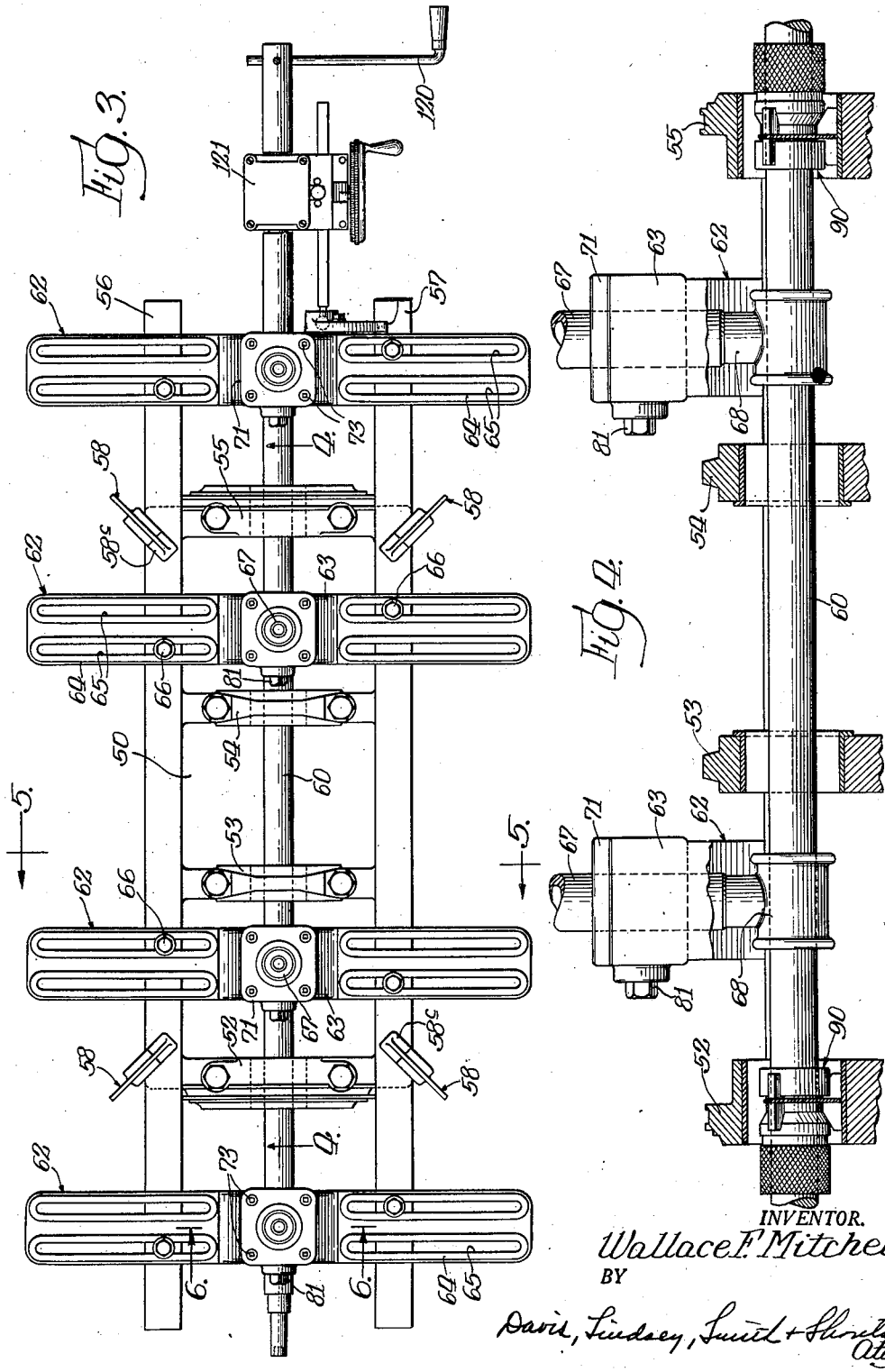
INVENTOR.
Wallace F. Mitchell.
BY
David, Lindsey, Smith & Shonts
Attys.

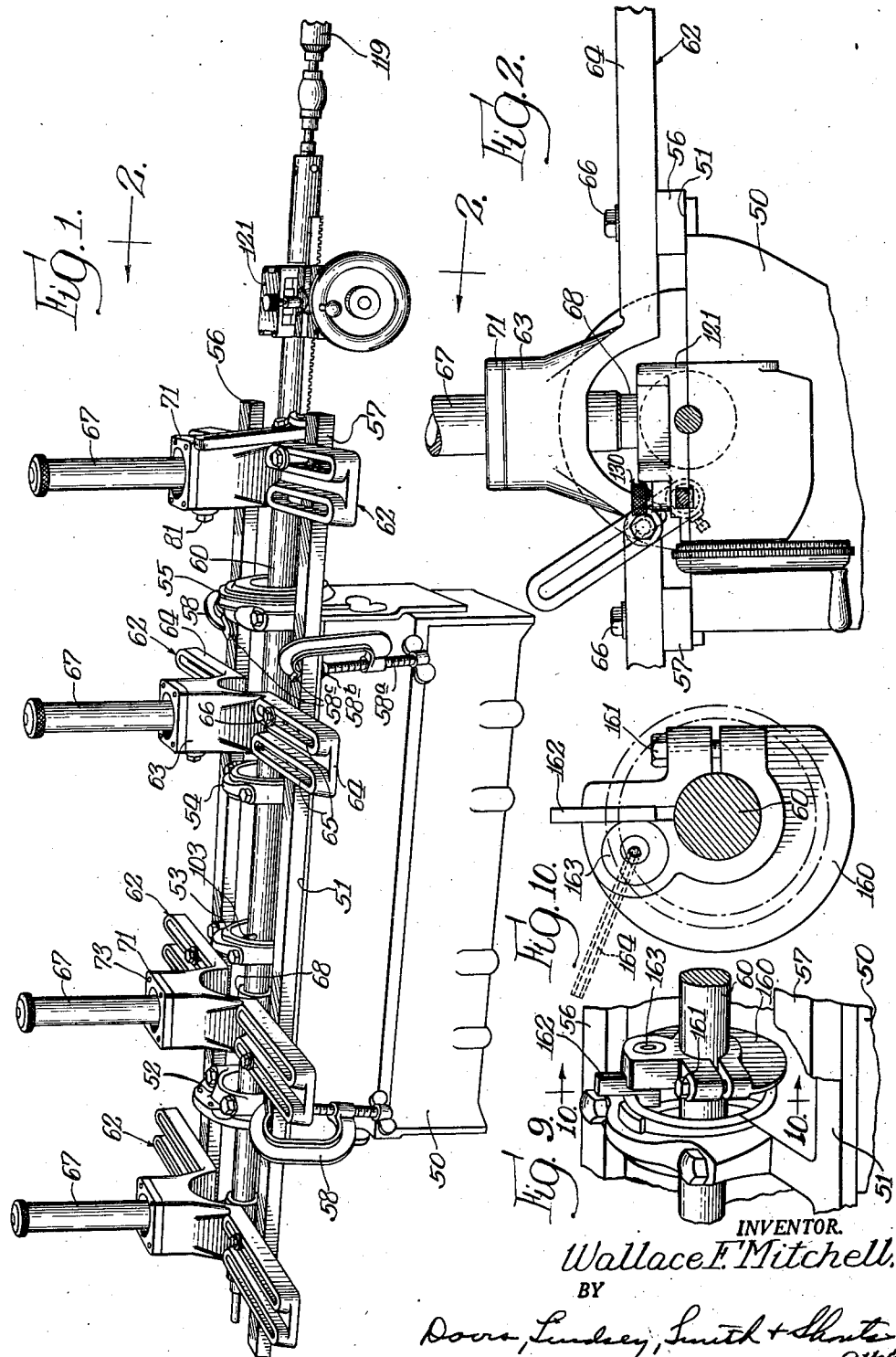

June 11, 1946.  W. F. MITCHELL  2,401,838
BORING MACHINE
Filed March 18, 1943  4 Sheets-Sheet 3
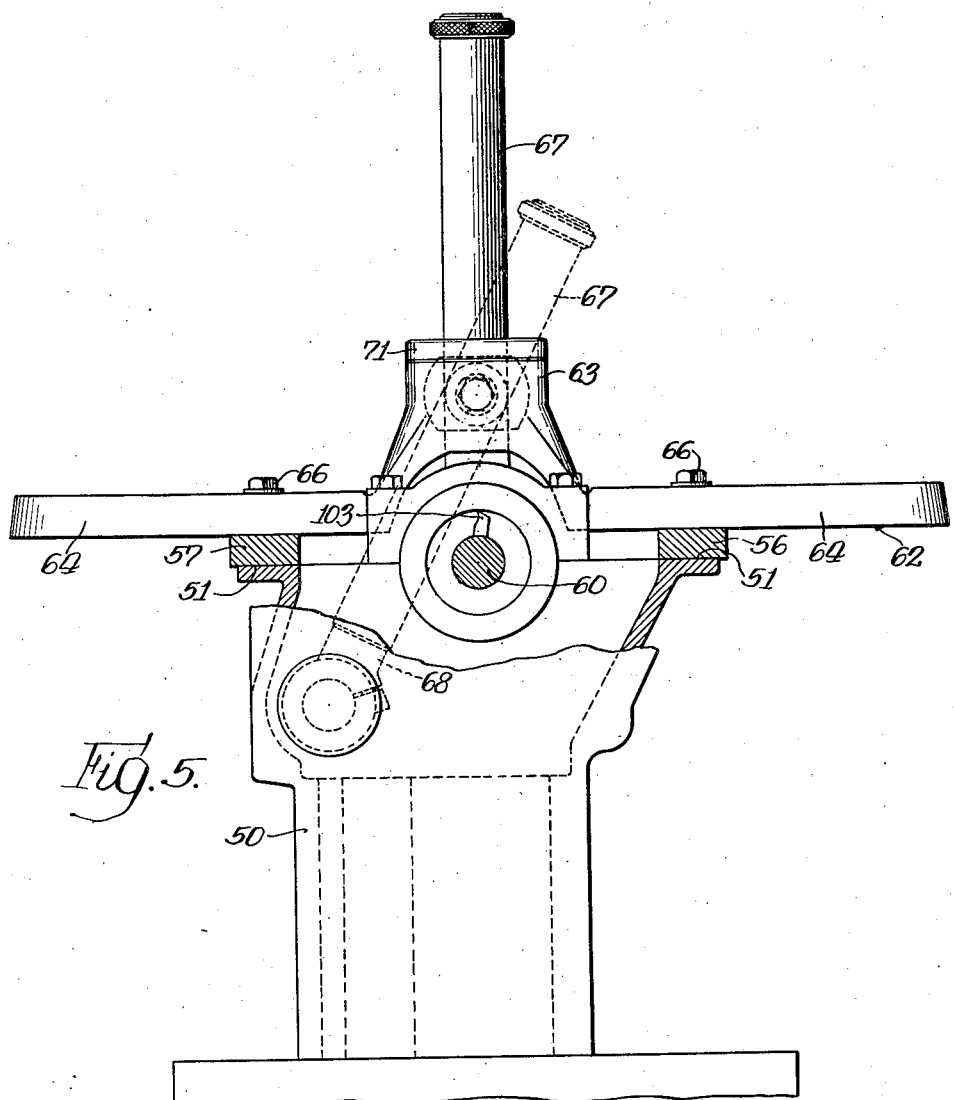
INVENTOR.
Wallace F. Mitchell.
BY
Dorr, Lindsey, Smith & Shonka
Attys.

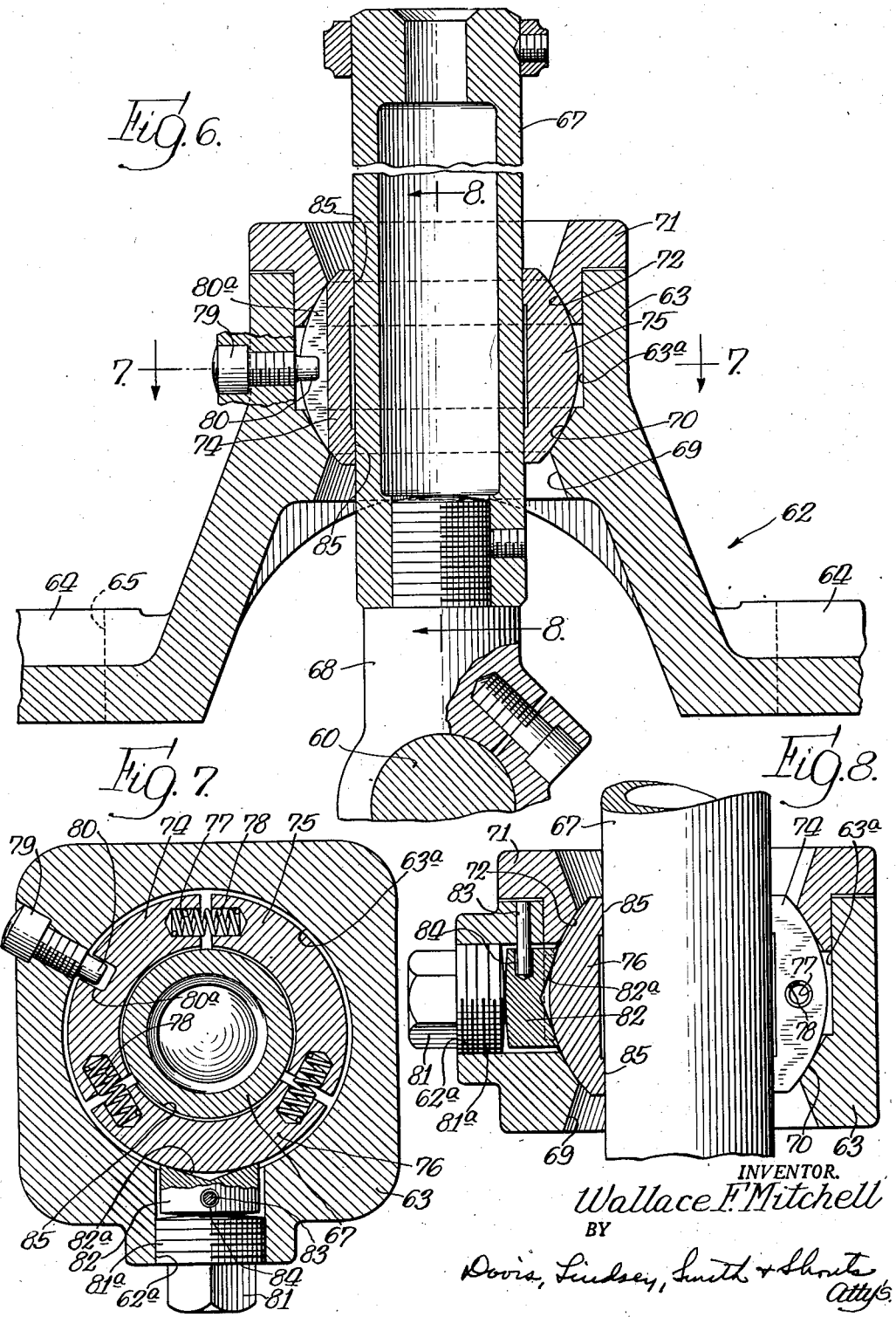

Patented June 11, 1946

2,401,838

UNITED STATES PATENT OFFICE 2,401,838

BORING MACHINE

Wallace F. Mitchell, Chicago, Ill., assignor to Automotive Maintenance Machinery Co., North Chicago, Ill., a corporation of Illinois Application March 18, 1943, Serial No. 479,579

9 Claims. (Cl. 77—2)

My invention relates to boring machines adapted for the boring of one or a plurality of so-called in-line bearings. It is especially useful in the boring of bearings of internal combustion engines but it also has utility in the boring of bearings of various types of production machines.

One of the objects of my invention is to provide an improved machine of the foregoing character which is simple in construction, easy to set up and operate, universal in adaptation, accurate in results, and which is adapted to bore bearings with a higher degree of efficiency than possible with machines heretofore devised.

Another object is to provide an improved boring machine which is adapted for rapid setup of the same as well as for rapid boring operations when set up.

A further object is to provide an improved boring machine wherein a setup once made may be maintained for a plurality of boring operations on successive cylinder blocks without the necessity of disassembling and reassembling.

Further objects are to provide an improved machine for boring crank shaft and cam shaft bearings and which is equally well adapted for the facing of crank shaft and other bearings.

An additional object is to provide a machine of the foregoing character by which the boring bar may be accurately centered with respect to the bearings to be bored and may be positively and accurately maintained in its centered condition, all without distortion of the boring bar, thereby securing accurate boring results.

Another object is to provide a machine for boring the crank shaft bearings of an engine without disturbing the crank shaft bearing caps, such caps and the bearing inserts therein remaining untouched during the complete operation.

A further object is to provide a machine of the foregoing character whereby the crank shaft bearings may be refaced after a boring operation without removing the boring bar from the machine setup. This insures maintenance of alignment and original setup for proper facing operation in respect to the particular bearing being operated upon. It is also a time-saving expedient.

Still another object is to provide a boring machine having improved boring bar bearing supports adapted for easily and quickly locking the bar bearings in positive alignment with the boring bar without twist, torque strain or other distortion.

An additional object is to provide a universally mounted boring bar support adapted to be clamped rigidly and firmly in adjusted position without the application of excessive clamping pressure by the operator, the clamping pressure being applied axially of the boring bar to avoid possible distortion laterally of the axis of the boring bar in clamping the support in place.

Other objects and advantages will become apparent as this description progresses and by reference to the accompanying drawings in which, Figure 1 is a perspective view showing a cylinder block having one form of machine embodying my invention applied thereto;

Fig. 2 is an enlarged end elevational view taken substantially at a position indicated by line 2—2 in Fig. 1;

Fig. 3 is a top plan view of the structure shown in Fig. 1;

Fig. 4 is a longitudinal section taken substantially on line 4—4 of Fig. 3 and illustrating the centering fixtures in place in the end crank shaft bearings;

Fig. 5 is an enlarged transverse sectional view taken substantially on line 5—5 of Fig. 4 and illustrating in dotted lines the boring bar bearing support in position for boring the cam shaft bearings;

Fig. 6 is an enlarged transverse sectional view through one of the bridge members and the boring bar bearing support taken substantially on line 6—6 of Fig. 3;

Fig. 7 is a section taken through the universal collet or clamping mechanism associated with the bearing support and taken substantially on line 7—7 of Fig. 6;

Fig. 8 is a vertical sectional view taken substantially on line 8—8 of Fig. 6;

Fig. 9 is a partial perspective view of the structure shown in Fig. 1 with a bearing facing tool applied thereto;

Fig. 10 is a sectional view taken substantially on line 10—10 of Fig. 9.

While the structure shown in the drawings is particularly adapted for the boring and facing of crank shaft and cam shaft bearings, it may also be employed advantageously for boring and facing bearings of any kind where similar conditions obtain.

In the use of my invention for the boring of crank shaft bearings, as illustrated in Fig. 1, a cylinder block 50 containing such bearings is inverted so as to bring its crank shaft pan rail surfaces 51 to an upright position for receiving and supporting the boring machine. The crank shaft bearings to be bored are located within the cylinder block at spaced points as generally indicated at 52, 53, 54 and 55 (Fig. 1).

The structure just referred to, which is illustrated in Figs. 1 to 10, inclusive, takes the form of a pair of parallel rails 56 and 57 (Fig. 1) of greater length than the cylinder block. These rails are adapted to be placed on the pan rails 51 and securely fastened in place thereon in substantially parallel relationship by C-clamps 58. These C-clamps are constructed to grippingly engage the parallel bars 56 and 57 and the pan rail 51 in such a way as to maintain the bars flush against the pan rail surfaces. To this end the C-clamp screw 58ᵃ (Fig. 1) is provided with a universal clamp head 58ᵇ which self-adjusts itself against the pan rail without a cocking action. The clamp 58ᵇ as well as the clamp jaw 58ᶜ is provided with a serrated gripping surface which provides sharp tooth-like surfaces that bite into and securely engage the material to prevent slippage of the clamp.

The machine includes a boring bar 60 which is of greater length than the parallel bars 56 and 57 and which is provided at a plurality of points with radial openings adapted to receive a tool bit which engages and cuts the bearing surfaces to be bored. This boring bar 60 is cylindrical in form and is adapted to be rotatably supported at a plurality of points by bearing members which must be accurately centered and aligned with respect to the bearings to be bored in order to accomplished an accurate line boring operation. The boring bar 60 is operably carried by a plurality (four in the form shown in Fig. 1) of bridge-like supporting units 62 which are constructed and arranged for easy, quick and accurate alignment of the boring bar and its bearings with the crank shaft bearings, which alignment is positively maintained during the boring operation.

More particularly, the bridge units 62 (Figs. 1, 3 and 6) are so located that a unit supports the bar at each end thereof and at various points intermediate its ends between the bearings to be bored. All of these bridge members are identical in form and only one thereof will be described in detail. Each bridge unit comprises an upright body portion 63 (Fig. 6) having at the bottom thereof a pair of oppositely extending leg portions 64 each of which is provided with a pair of elongated, spaced, parallel slots 65 which are adapted to receive fastening devices 66 carried by the parallel bars 56 and 57 for securing the bridge members to such bars. It will be appreciated that the width of the pan portions of cylinder blocks may vary and that such variation in width is taken care of by the slots 65, whereby a single set of similar bridge members 62 accommodate a wide range of different width engine blocks. For example, the slots may accommodate block widths varying from 6½" to 21" and even more.

The upstanding body portion 63 (Fig. 6) of the bridge members is adapted to carry an upright bar 67 which at its lower end is provided with a boring bar bearing 68. The bearings 68 carry the boring bar and, in order to insure proper alignment of the bearings 68 with the crank shaft bearings, the bearing supporting bar 67 is universally mounted in the bridge body 63. The universal mechanism is such that the upright 67 may be firmly clamped in position by slight pressure and without distortion of the parts in such a way that would prevent distortion to the boring bar 60.

More specifically, the bridge body 63 (Figs. 6, 7 and 8) is provided with a central opening 69 open at its top and bottom, the lower end of which opening is provided with an annular tapered seat 70 spaced inwardly from the upper inner wall 63ᵃ. The upper end of the body 63 is provided with a collar-like cover 71 secured to the body by screws 73, the lower inner edge of which is tapered similarly to the seat 70 at a point spaced inwardly from the wall 63ᵃ providing a seat 72 in vertical alignment with the seat 70. The universal clamping means for adjustably supporting the bearing upright 67 takes the form of a ball-like member having three equally and similarly shaped segments 74, 75 and 76 which, in assembled relation, provide a tubular ball-like member which receives the cylindrical upright support 67. The outer circular surfaces of the ball segments 74, 75 and 76 are of such size that when the cover 71 is in place, their upper and lower parts fit against the seats 70 and 72, being confined therebetween for ball-like universal action. The segments 74, 75 and 76 are each provided in their facing edges with aligned openings 77 which receive and confine coil springs 78 which are normally under tension and are of sufficient length and strength to tend at all times to yieldingly spread apart the ball segments 74, 75 and 76. In this way the ball surfaces are normally yieldably and frictionally engaged with the seats 70 and 72, tending to spring apart such segments to an extent to permit the bearing upright members 67 to pass freely therebetween. It will be seen that it is desirable that the segments be maintained in a fixed rotary position, and this is accomplished by a pin 79 carried by the bridge body 63. The pin 79 has a reduced end or nose 80 received in a vertical slot 80ᵃ in the wall of the adjacent ball segment 74. This permits universal rocking movement of the ball segments as a unit in opposite directions, while at the same time preventing rotation of the segments without interfering with the universal action.

The ball segments are adapted to be clamped tightly against the upright 67 in such a way as to insure a uniform clamping action for all segments without distortion of the unit and boring bar carried thereby. This provides a positive and firm clamping or locking action upon a slight application of pressure by the operator. To this end the bridge body 63 is provided with an adjustable clamping nut 81 (Figs. 7 and 8) so located that its axis extends substantially parallel with the axis of the boring bar 60. This adjusting nut 81 is threaded at 81ᵃ and is received in a threaded opening 62ᵃ in the bridge body with its inner end engaging (but not fastened to) a compression plug 82 having at its inner end a conical seat 82ᵃ which engages the adjacent spherical surface of the ball segment 76. The plug 82 is a floating member, so to speak, permitting it to adjust itself to the ball segment without a cramping action which would tend to distort the setup. While this plug is floating and free to adjust itself as stated, it is desirable to prevent its displacement rotatably when the clamping nut 81 is rotated to effect the clamping action. Specifically, I provide a pin 83 carried in a suitable opening in the wall of the bridge body 63 and extending into a larger opening 84 in the adjacent wall of the plug 82. The opening 84 is large enough to permit certain play in the plug 82 to permit of the adjustment above referred to while avoiding any torsional effects that would tend to distort in the setting up of the plug 81. When the plug 82 is tightened the segments 74, 75 and 76 are uniformly moved toward each other and the upright 67 to effect a clamping action and, since the force applied through the plug 82 is in a direction parallel with the axis of the boring bar 60, all tendency to laterally distort the boring bar is avoided. The springs 78 not only perform the function hereinabove stated, but they also tend to hold the several ball segments in alignment with each other and press them against the seats 70 and 72 with sufficient force to hold them in firmly seated relation against dropping downwardly out of their proper seat-engaged position when the clamp is released. By thus holding them at their active clamping elevation, I avoid the necessary resultant raising action that would take place if the springs were not there when the plug is tightened and which would cause at times inaccurate setting of the segments and unnecessary wear of the same. If shifting of the ball segments should occur it would also result in shifting of the bearing support and in turn the bearing, thereby disturbing the alignment which had already been accomplished. The springs 78 therefore play a very important part in the true and accurate alignment action accomplished in the setup of this tool.

Further, in order to insure a uniform and positive clamping action between the ball segments 74, 75 and 76 and the upright 67, I provide each segment, at its inner face, with end or spaced-apart bearings surfaces 85 so that each segment engages the upright 67 at spaced apart points substantially in alignment with the ball seats 70 and 72. In this way, the segments 74, 75 and 76 always clampingly engage the upright 67 at spaced apart points and at direct pressure-applied points so as to insure multiple clamping engagement upon the tightening of the plug 82. When the plug 82 is tightened the segments 74 and 75 are brought into tight clamping engagement with the seat surfaces 70 and 72 while the segment 76 is moved away from such seats in compressing the springs 78, bringing the segments closer together and contracting them in clamping engagement with the upright 67. In this case the support afforded the segment 76 normally by the seats 70 and 72 is now taken up by the conical face 82a of the compression plug 82 so that the segments are fully supported at all times with an equalized pressure applied throughout the circumference of not only the ball support but the upright 67. This equalization of pressure is such as to avoid distortion of any of these parts which might be transmitted to the boring bar in turn causing inaccurate boring. It will be appreciated that spaced apart clamping points such as those between the segments and the upright 67 insure a fixed clamping action with a slight application of pressure, whereby the upright 67 and its boring bar bearing will be held in adjusted condition without danger of change of position which would tend to distort the boring bar. These spaced apart clamping points, as distinguished from a single clamping point, insure such a clamping action even though the clamping surface may become marred or damaged or have dirt thereupon.

Accurate boring operation requires that the boring bar be accurately centered with respect to the end bearings so that all bearings may be bored concentrically with respect to each other to take care of any out of alignment condition due to warpage or otherwise. To this end I provide centering fixtures 90 (Fig. 4) which are mountable on the boring bar and are expansible within the end bearings to center the boring bar with respect thereto. These centering fixtures constitute the subject matter of divisional application, Serial Number 522,765, filed February 17, 1944.

In setting up the machine to bore the crank shaft bearings of the block 50, I first pass the boring bar 60 through the right-hand (Fig. 1) bridge bearing 68, thence through a centering fixture in the first bearing 55, thence through the next bridge bearing 68, thence through the next bearings 54 and 53, the next bridge bearing 68, through a centering fixture in the next bearing 52 and finally through the bridge bearing 68 of the last bridge member. When I have done that I then center the boring bar 60 in the end bearings 52 and 55. After having centered the boring bar in the end bearings I next tighten all of the clamps in the bridge members 62 to secure the boring bar bearing upright 67 in its aligned condition so that the boring bar bearings will all be aligned and will be held in that position after the centering fixtures have been removed and during the boring operation. After having set up the boring bar supports in the manner stated, I next remove the centering fixtures. To this end the centering fixtures are released sufficiently to permit them to move in the respective bearings and upon the boring bar. The boring bar is then manually moved longitudinally, first one end and then the other, to an extent sufficient to permit the removal of the centering fixture from the end thereof, being removed from the endmost bearing supports for this purpose. In each instance, while it is so removed from the endmost bearing supports, it is supported by the remaining bearings so that no disalignment occurs. After the centering fixtures have been removed and the boring bar is restored to its fully supported, aligned position, and a tool bit 103 is properly located as described in my co-pending divisional application Serial No. 522,764, filed February 17, 1944, the machine is ready to be driven for the boring operation.

Preferably a single boring bit is employed in boring all of the bearings. This is advisable in view of the fact that it would be difficult, in view of the spacing of crank shaft bearings in different engines, to provide locations which would enable the use of a plurality of boring bits which would simultaneously engage and properly bore all of the bearings at the same time. Therefore, to avoid this difficulty and the inconvenience of trying to align the boring bits with all bearings and to further add to the universal adaptation of the tool, a single bit may be employed, the same being reapplied and readjusted to the proper position for successively boring the several bearings.

After the boring bit has been adjusted for the boring of the first bearing the boring bar is ready to be driven. In the boring operation the boring bar is driven by power means, such as an electric drill or other suitable means. A part of such an electric drill 119 is illustrated in Fig. 1. The boring bar is also adapted for manual rotation by a detachable handle 120. Of course when the boring bar is being driven by power the handle may be removed. Also, both ends of the boring bar 60 are provided with adapters for reconnection of the power drive connections so that the bar 60 may be driven from the opposite ends to permit the boring operation to be performed from either end where space does not permit boring from a particular end. In the boring operation it is necessary that feed means be employed for feeding the boring bar in boring direction at a desired rate, dependent upon the conditions of use. A suitable feed means, preferably that described in my co-pending divisional application, Serial No. 553,320, filed September 9, 1944, is shown at 121 (Figs. 1 and 2), but since this does not constitute any part of the invention herein claimed, it will not be further described except to say that the feed is both manual and power-operated. Manifestly, any suitable feed means could be employed as an adjunct to the present invention.

I believe that the use of my invention for the boring of crank shaft bearings will be well understood from the foregoing description. After boring the crank shaft bearings the same may be faced easily and quickly in accordance with my invention by using a facing tool bit holder 160 such as shown in Figs. 9 and 10. Specifically, this tool bit holder 160 is adapted to be clamped upon the boring bar 60 in close proximity (but not in operative engagement with) to the particular bearing to be faced. This clamping action is accomplished by tightening a clamping bolt 161 which effects the clamping action in a manner which will be well understood from Figs. 9 and 10. The holder 160 is provided with a slot adapted to receive a facing bit 162 which is securely locked in proper position in its slot by an eccentric 163 adapted to be moved to and from locking position by any suitable means such as a bar 164.

In facing a bearing after the tool bit and its holder have been properly applied, the feed mechanism is moved to neutral position, which conditions the feed means for manual operation and permits the operator to manually set the facing bit 162 in proper operative relation with respect to the bearing to be faced.

In the facing operation the boring bar is rotated manually through the hand crank 120 (Fig. 3); and as the boring bar is rotated it is fed longitudinally by rotating the hand wheel of the feed mechanism. It will be seen from the foregoing that the necessity of using special facing fixtures is completely avoided in the use of my invention. This affords quite an advantage in that the boring bar 60 need not be removed after a boring operation to face a bearing; whereas, with prior devices, the boring bar had to be removed after the boring operation in order to apply a facing fixture by which the operator could determine when he had removed the requisite amount of material. The feed mechanism above described makes possible the attainment of this advantage which not only reduces the cost of the tool structure but also saves time and greatly facilitates the facing operation.

As hereinabove stated, my invention is adapted for the boring of cam shaft bearings as well as crank shaft bearings. In case it is desired to bore the cam shaft bearings, the operator need only adjust the boring bar carrying parts to the dotted line positions shown in Fig. 5. It will be seen that the cam shaft bearings are below and to one side of the crank shaft bearings. To position the boring bar for boring the cam shaft bearings the universal boring bar upright 67 is released and dropped down and swung sidewise so that its lower end is in the position indicated in Fig. 5, in which position the universal ball clamping means shown in Figs. 7 and 8, including the nut 81, are adjusted (as previously described) to clamp and hold the upright 67 and the boring bar in the position stated. Further operation in boring cam shafts is the same as already described in connection with the boring of crank shafts.

I believe that the advantages of my invention as above stated will be obvious from the foregoing description. My invention provides a single machine suitable for boring both crank shaft and cam shaft bearings. The tool mechanism is such that the device may be set up for the boring operation easily and quickly and in such a way as to avoid distortion of the boring bar which would materially affect the accuracy of the boring operation. The boring operation may be carried out with a higher degree of accuracy than heretofore. This is accomplished through a facile and accurate manner of centering the boring bar and the minimum number of manipulations required to accommodate the tool to the boring operation. This is also aided by the fact that my invention eliminates the necessity of using centering rings or the like, thereby avoiding assembly and disassembly of the bearings in order to center the boring bar therein.

I claim:

1. A boring bar support for a boring machine adapted to be secured to a cylinder block in cooperative relation to the crank shaft bearings thereof, which comprises a member adapted to be secured to the cylinder block and having a hollow body portion, a second member extending through said body portion and having at one end a bearing adapted to rotatably support the boring bar, universal support means carried by said body portion and consisting of a tubular segmental ball device adapted to receive said second member, seat means in said body portion adapted to be engaged by said ball device for confined universal movement of the latter, and clamp means carried by said body portion and adjustable laterally of the axis of said ball device for clamping said ball device upon said second member and upon said seat means.

2. A boring bar support for a boring machine adapted to be secured to a cylinder block in cooperative relation to the crank shaft bearings thereof, which comprises a member adapted to be secured to the cylinder block and having a hollow body portion, a second member extending through said body portion and having at one end a bearing adapted to rotatably support the boring bar, universal support means carried by said body portion and consisting of a tubular segmental ball device adapted to receive said second member, seat means in said body portion adapted to be engaged by said ball device for confined universal movement of the latter, spring means between the segments of said ball device holding the same in alignment and tending to expand the same into engagement with said seat means, and clamp means carried by said body portion and adjustable laterally of the axis of said ball device for clamping said ball device upon said second member and upon said seat means.

3. In a machine for boring the bearings of an engine cylinder block, a boring bar, and means for supporting said boring bar in centered position with respect to the bearings to be bored which includes a member adapted to be secured to the cylinder block and having a hollow body portion with an annular seat therein, a ball device having an axial opening therethrough and formed of a plurality of segments, the outer surface of said ball device being shaped complementally to said seat so that said device is retained for universal action, spring means between said segments, maintaining them in axially aligned condition and constantly tending to urge said segments into engagement with said seat, a bar-supporting member having a bearing on one end adapted to receive the boring bar and having its other end projecting through said ball device opening, and clamp means for clamping said segments against the boring bar and against said seat.

4. In a machine for boring the bearings of an engine cylinder block, a boring bar, and means for supporting said boring bar in centered position with respect to the bearings to be bored which includes a member adapted to be secured to the cylinder block and having a hollow body portion with a pair of axially spaced seat elements therein, a ball device formed of a plurality of segments engaging said seat elements and having an axial opening therethrough, the outer surface of said ball device being shaped complementally to said seat elements so that said device is retained in said body portion against axial displacement, spring members between said segments retaining them in aligned condition and tending to spread them apart to yieldingly engage said seat elements, a boring bar support passing through said ball device and adapted to be gripped by said segments, and means for clamping said segments against the boring bar and also against said seat elements to retain said boring bar support in a predetermined adjusted position.

5. In a machine for boring the bearings of an engine cylinder block, a boring bar, and means for supporting said boring bar in centered position with respect to the bearings to be bored which includes a member adapted to be secured to the cylinder block and having a hollow body portion with a pair of axially spaced seat elements therein, a ball device formed of a plurality of segments engaging said seat elements and having an axial opening therethrough, the outer surface of said ball device being shaped complementally to said seat elements so that said device is retained in said body portion against axial displacement, spring members between said segments retaining them in aligned condition and tending to spread them apart to yieldingly engage said seat elements, a boring bar support passing through said ball device and adapted to be gripped by said segments, and means carried by said body portion and adjusted axially of said ball device to contract said segments uniformly into gripping engagement with said bar support and to grippingly engage the ball device as a whole with said seat elements.

6. In a machine for boring the bearings of an engine cylinder block, a boring bar, and means for supporting said boring bar in centered position with respect to the bearings to be bored which includes a member adapted to be secured to the cylinder block and having a hollow body portion with a pair of axially spaced seat elements therein, a ball device formed of a plurality of segments engaging said seat elements and having an axial opening therethrough, the outer surface of said ball device being shaped complementally to said seat elements so that said device is retained in said body portion against axial displacement, spring members between said segments retaining them in aligned condition and tending to spread them apart to yieldingly engage said seat elements, a boring bar support passing through said ball device and adapted to be gripped by said segments, means for clamping said ball device and bar support in adjusted position which includes an element mounted in said body portion and rotatably adjustable inwardly thereof, a clamp element between said adjustable element and the adjacent one of said segments, said clamp element having a segment-engaging face shaped complementally to the outer surface of said segment, and means for preventing rotation of said clamp element as said adjustable element is adjusted to clamp said ball device in adjusted condition.

7. In a machine for boring the bearings of an engine cylinder block, a boring bar, and means for supporting said boring bar in centered position with respect to the bearings to be bored which includes a member adapted to be secured to the cylinder block and having a hollow body portion with a pair of axially spaced seat elements therein, a ball device formed of a plurality of segments engaging said seat elements and having an axial opening therethrough, the outer surface of said ball device being shaped complementally to said seat elements so that said device is retained in said body portion against axial displacement, spring members between said segments retaining them in aligned condition and tending to spread them apart to yieldingly engage said seat elements, a boring bar support passing through said ball device and adapted to be gripped by said segments, means for clamping said ball device and bar support in adjusted position which includes an element mounted in said body portion and rotatably adjustable inwardly thereof, the axis of said adjustable element extending substantially radially of said ball device, a clamp element between and frictionally engaged with said adjustable element and the adjacent one of said segments, said clamp element having a segment-engaging face shaped complementally to the outer surface of said segment and adapted to support such segment when the clamping means is tightened, and means for preventing rotation of said clamp element as said adjustable element is adjusted to clamp said ball device in adjusted condition.

8. In a machine for boring the bearings of an engine cylinder block, a boring bar, and means for supporting said boring bar in centered position with respect to the bearings to be bored which includes a member adapted to be secured to the cylinder block and having a hollow body portion with an annular seat means therein, a ball device having an axial opening therethrough and formed of a plurality of segments, the outer surfaces of which are shaped complementally to said seat means so that said ball device is confined for universal action, a pair of narrow annular axially spaced seat elements formed along the wall of the opening of said ball device, a boring bar support having a boring bar bearing on one end with its other end projecting through said ball device opening in engagement only with said seat elements, and clamp means for grippingly engaging said segments with said bar support and also with said body seat means to lock said support in adjusted position.

9. In a machine for boring the bearings of an engine cylinder block, a boring bar, and means for supporting said boring bar in centered position with respect to the bearings to be bored which includes a member adapted to be secured to the cylinder block and having a hollow body portion with an annular seat means therein, a ball device having an axial opening therethrough and formed of a plurality of segments, the outer surfaces of which are shaped complementally to said seat means so that said ball device is confined for universal action, a pair of narrow annular axially space seat elements formed along the wall of the opening of said ball device, a boring bar support having a boring bar bearing on one end with its other end projecting through said ball device opening in engagement only with said seat elements, and clamp means adjustable by pressure applied substantially radially of said ball device to uniformly contract said segments into clamping engagement with said bar support and to clampingly engage said ball device as a whole with said body seat means.

WALLACE F. MITCHELL.